UNITED STATES PATENT OFFICE.

DIEDERICH FEHRMAN, OF LIVERPOOL, ENGLAND.

IMPROVEMENT IN THE MANUFACTURE OF RESIN.

Specification forming part of Letters Patent No. 27,624, dated March 27, 1860.

*To all whom it may concern:*

Be it known that I, DIEDERICH FEHRMAN, a citizen of the United States of America, now temporarily residing in Liverpool, England, have invented an Improved Process for Obtaining Rosin, of which the following is a specification.

The nature of my invention consists of a process for the production of an improved rosin, obtained as is hereinafter described.

I take common crude turpentine and place it in a room heated by steam or fire to a temperature of not more than 100° Fahrenheit, and then cause it to pass through a sieve made of copper wire tinned, or other suitable strainer. From this sieve or strainer it falls into another strainer of so fine a texture as to thoroughly remove all the mechanical impurities mixed with it. During this process the crude turpentine is not allowed to exceed the temperature above named.

The apparatus which I find it convenient to use for my purpose consists of an ordinary copper vacuum-pan furnished with a steam-jacket, such as is used for sugar-refining purposes, but thoroughly tinned inside. This pan is furnished with a tinned copper steam-pipe one inch in diameter, conveniently supplied with steam from a boiler, and passing to the bottom of the pan and branching out over the whole bottom. This pipe is so perforated as to be capable of distributing a small quantity of steam throughout the mass of the contents of the pan.

The vacuum-pan is capable of holding about two thousand gallons of water, and my operation is conducted by introducing about seven tons of crude turpentine, filtered and clarified as before described, into the vacuum-pan, together with a small quantity of water—say one hundred gallons. Steam at the ordinary pressure of the atmosphere is then turned into the steam-jacket, and a vacuum or partial vacuum is made in the pan by the action of the air-pump worked by steam or other suitable power. The water and spirits of turpentine are then boiled off at as low a temperature as possible and received in suitable vessels, and when the temperature of the contents of the pan rises to 150° Fahrenheit steam at the ordinary pressure is turned into it through the inch pipe previously described. During this part of the process it is desirable that the contents of the vacuum-pan should not rise above 170° Fahrenheit. The introduction of steam is continued until the whole of the spirits of turpentine has been removed from the rosin, when the supply is cut off. The temperature of the pan is then allowed to rise to 180° Fahrenheit, when the whole of the water remaining in the rosin will be rapidly distilled, leaving the rosin perfectly clear and transparent and fit for all the purposes in the arts and manufactures to which virgin rosin is usually applied.

Having thus described the nature of my invention and the best means with which I am acquainted of performing the same, I would have it understood that I am aware that stills and vacuum-pans have been before used in a similar way for the treatment of petroleum and schist oils.

I do not claim the several steps of the process herein described, as they have been in use separately before; but What I do claim as new, and desire to secure by Letters Patent as my invention, is—

The combined process herein described, having for its object the manufacture of rosin, as set forth.

Liverpool, the 9th day of September, 1859.

DIEDR. FEHRMAN. [L. S.]

Witnesses:
 POWHATAN CLARKE,
 JOHN SHAW,
  *Consulate at Liverpool.*